United States Patent [19]

Shimano

[11] 4,286,953
[45] Sep. 1, 1981

[54] BICYCLE DERAILLEUR HAVING AN IMPROVED MECHANISM FOR SWINGING A CHAIN GUIDE

[75] Inventor: Keizo Shimano, Sakai, Japan

[73] Assignee: Shimano Industrial Company Limited, Osaka, Japan

[21] Appl. No.: 142,378

[22] Filed: Apr. 21, 1980

[30] Foreign Application Priority Data

May 4, 1979 [JP] Japan .................... 54-59800[U]

[51] Int. Cl.³ .................................. F16H 11/08
[52] U.S. Cl. .................................... 474/80
[58] Field of Search ................ 474/81, 80, 79, 78, 474/82

[56] References Cited

FOREIGN PATENT DOCUMENTS 908020  8/1945  France ............................. 474/80
737533  9/1955  United Kingdom ............. 474/80

Primary Examiner—C. J. Husar
Assistant Examiner—Conrad Berman
Attorney, Agent, or Firm—Stevens, Davis, Miller & Mosher

[57] ABSTRACT

A bicycle derailleur comprising a supporting member supported swingably through a first vertical shaft, the supporting member supporting a change-over frame swingably through a second horizontal shaft having an axis intersecting the axis of the first shaft substantially at a right angle therewith, a first pulley supported rotatably to the change-over frame through the second shaft and a second pulley supported rotatably to the foremost end of the change-over frame through a third horizontal shaft in parallel with the second shaft. In operation, a control wire is operated to swing the change-over frame together with the supporting member around the first shaft, thereby switching a driving chain to a selected sprocket of a multistage sprocket assembly.

7 Claims, 3 Drawing Figures

BICYCLE DERAILLEUR HAVING AN IMPROVED MECHANISM FOR SWINGING A CHAIN GUIDE

FIELD OF THE INVENTION

This invention relates to a derailleur for a bicycle, and more particularly to a derailleur for a bicycle, which employs no linkage mechanism to switch a driving chain to a selected one of a plurality of multi-stage sprockets for changing the bicycle speed.

BACKGROUND OF THE INVENTION

Generally, a derailleur for a bicycle has a parallelogram linkage mechanism comprising a fixing member, two parallel link members supported thereto, and a movable member supported to the link members. The linkage mechanism is transformed to move the movable member, so that a change-over frame supported thereto and having two pulleys switches a driving chain to a selected one of the multi-stage sprockets.

In this derailleur construction, since the two pulleys, i.e., the tension pulley and the guide pulley, move following movement of the movable member, the drive chain, which travels from a front chain gear, enters the derailleur in different positions every time for changing speed, thereby causing the drive chain to rock. When such a derailleur is applied to a bicycle for a motorcross race, the rocking is particularly significant causing the chain to come off the sprocket.

This type of bicycle derailleur, employing the linkage mechanism, is also complicated in construction, especially, the two-stage speed change type used for a motocross race bicycle, and is expensive to produce.

SUMMARY OF THE INVENTION

In the light of the aforesaid problems, this invention has been designed. An object of the invention is to provide a bicycle derailleur, which is simple in construction and capable of receiving a driving chain always in a constant position to thereby change speed without rocking the chain.

This invention is characterized in that the derailleur, instead of using the conventional linkage mechanism, supports a change-over frame having two pulleys, directly to a fixing member through a supporting member, so that the change-over frame swings to switch the drive chain to a selected one of the multi-stage sprockets. The invention is further characterized in that the supporting member is supported to the fixing member through a first shaft extending vertically, the change-over frame is supported swingably to the supporting member through a second shaft extending horizontally and having its axis intersecting the axis of the first shaft substantially at a right angle therewith, and a first pulley is supported rotatably to the second shaft and a second pulley is supported rotatably to the front end of the change-over frame through a third shaft parallel to the second horizontal shaft.

DETAILED DESCRIPTION OF THE INVENTION

Figure 1:
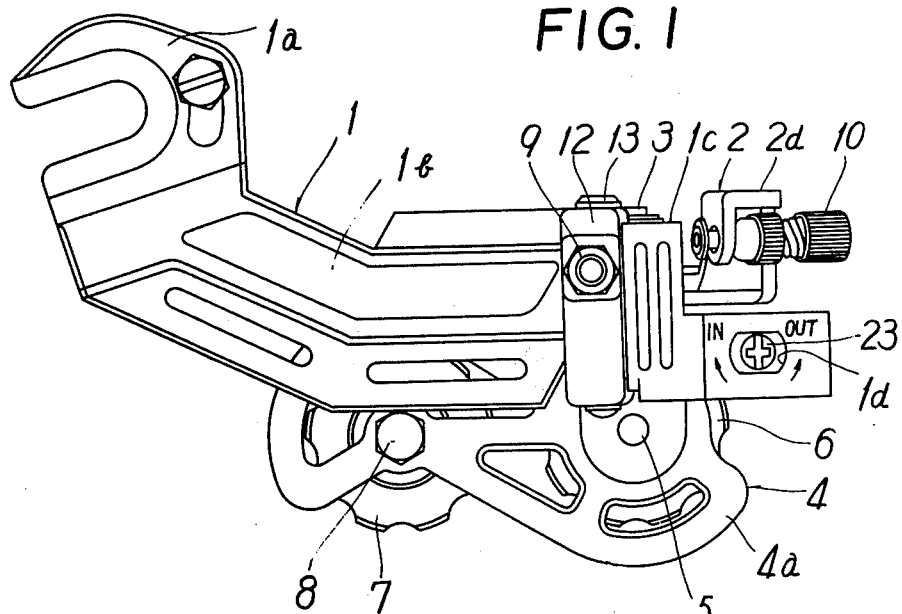
FIG. 1 is a front view of an embodiment of a derailleur of the invention.
Figure 2:
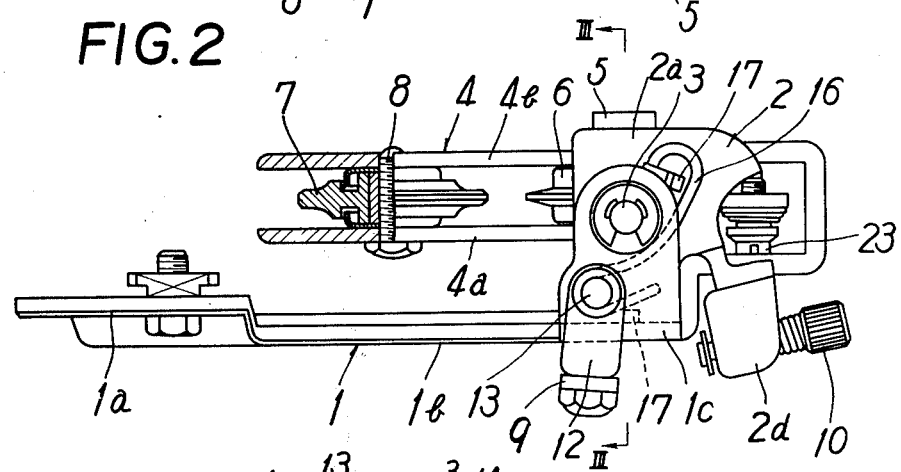
FIG. 2 is a partially cutaway plan view thereof.

Referring to the drawings, a two stage speed change derailleur is shown, and its typical components will be described briefly as follows. Reference numeral 1 designates a fixing member fixed to the bicycle frame, 2 designates a support member supported swingably to the fixing member 1 through a first shaft 3 extending vertically, 4 designates a change-over frame supported swingably to the support member 2 through a second shaft 5 extending horizontally and having an axis Y—Y intersecting the axis X—X of the first shaft 3 substantially at a right angle therewith, 6 designates a first pulley supported rotatably onto the second shaft 5, 7 designates a second pulley supported rotatably to the foremost end of change-over frame 4 through a third shaft 8 extending horizontally in parallel to the second shaft 5, 9 designates a fixture provided at the fixing member 1 to fix a control wire (not shown), and 10 designates a support provided at the supporting member 2 to support an outer sheath (not shown) guiding the control wire.

In this construction, the fixing member 1 is formed of a metallic plate and comprises a bracket member 1a fixed together with a hub shaft to a fork end at the bicycle and an extension 1b extending frontward of the bicycle from the bracket member 1a along a chain stay. The extension 1b extends horizontally laterally from the upper edge of the foremost end to form a horizontal portion 1c. The horizontal portion 1c carries thereon a bush 11 for rotatably supporting the first shaft 3, and swingably supports an arm 12 having the fixture 9 for the wire, through a fourth shaft 13 extending vertically.

Figure 3:
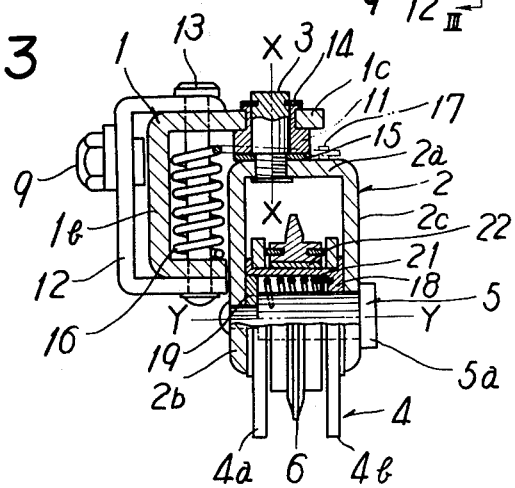
FIG. 3 is a sectional view taken on the line III—III in FIG. 2.

The support member 2, as shown in FIG. 3, comprises a horizontal top plate 2a and a pair of side plates 2b and 2c perpendicularly connected thereto, and has an inverted U-shape in section. The first shaft 3 is screwed with the top plate 2a. The second shaft 5 is fixed across the opposite side plates 2b and 2c and supports the change-over frame 4. The top plate 2a has an extension 2d carrying the support 10 for the outer sheath. The support member 2 is supported swingably to the fixing member 1 through the first shaft 3 which is inserted into the bush 11 and held by an E-ring 14. Numeral 15 designates a washer and 16 designates a spring which is wound onto the fourth shaft 13 and retained at one end to the arm 12 and at the other end to a spring seat provided at the top plate 2a of support member 2, the spring 16 functioning both for energy conservation and restoration of the support member 2.

The second shaft 5 is headed 5a and axially stepped and supports the change-over frame 4 swingably through a tubular shaft 18 having a round bearing surface and through a disc-shaped bush 19.

The tubular shaft 18 is inserted into a pair of plates 4a and 4b constituting the change-over frame 4 and has at one end the bush 19 fixed thereto, so that the change-over frame 4 is supported swingably to the second shaft 5 through the tubular shaft 18 and bush 19. The tubular shaft 18 also has an inner diameter larger than an outer diameter of the second shaft 5 and carries at the outer periphery the first pulley 6 rotatably through a metal bearing 22. A coiled tension spring 21 is housed between the inner periphery of tubular shaft 18 and the outer periphery of second shaft 5, and is retained at one end to the second shaft 5 and at the other end to the tubular shaft 18 fixed to the change-over frame 4, thereby biasing the change-over frame 4 in the direction of tensioning a driving chain (not shown). In other words, the tension spring 21 applies constant tension to the chain, but this is not a requisite for this invention.

Reference numeral 23 designates an adjusting bolt for adjusting a range of swinging motion of the second pulley 7 carried by the change-over frame 4. The adjusting bolt 23 abuts at its tip against the extension 1b of fixing member 1 and is controllable through a window 1d provided at the foremost end of extension 1b.

In the described construction, the control wire is fixed to the fixture 9 and the outer sheath 10 is fixed to the support 10, so that a control lever (not shown) can be operated to pull the wire to swing the change-over frame 4 mounted on the supporting member 2 around the first shaft 3 against the restoring force of the return spring 16, whereby the chain is guided by the first and second pulleys 6 and 7, and switched to a selected one of the multi-stage sprockets. Furthermore, the change-over frame 4 is biased clockwise in FIG. 1 by the spring 21 so as to swing around the second shaft 5 when the chain is switched, thereby applying constant tension to the chain.

The first pulley 6 is scarcely shifted and is kept in constant position when the chain is switched due to the fact that the pulley 6 is supported by the second shaft 5 having the axis Y—Y which intersects the axis X—X of first shaft 3 substantially at a right angle with the axis X—X. Hence, the second pulley 7 functions as the tension pulley as well as the guide pulley because the change-over frame 4 swings around the first shaft 3 and around the second shaft 5, whereby the chain, when switched, scarcely rocks to enable its smooth switching to the selected one sprocket.

In the described embodiment, the wire fixture 9 is provided at the arm 12 which is swingably supported to the fixing member 1. Hence, if a greater resistance against speed change is applied to the derailleur when the wire is pulled to switch the chain to the low speed sprocket during the absence of pedalling, the arm 12 swings to conserve energy in the spring 16, and upon release of the resistance, the speed change is executed.

Alternatively, the fixture 9 for the wire may be mounted on the support member 2 and the support 10 for the outer sheath may be mounted on the arm 12.

As clearly understood from the aforesaid description, the derailleur of the invention, which employs no linkage mechanism, is simple in construction in comparison with conventional derailleurs. Furthermore, the first pulley is supported to the second horizontal shaft and has an axis intersecting the axis of the first shaft substantially at a right angle therewith, thereby always receiving the chain in a constant position. Hence, the chain, is guided by the second pulley to a selected sprocket for changing speed without rocking. Thus, the derailleur of the invention provides an optimum shifting arrangement which is especially suitable for a motocross race bicycle.

While an exemplary embodiment of the invention has been shown and described, the invention is not limited to this specific description, but is limited solely by the appended claims.

What is claimed is:

1. A bicycle derailleur for shifting a driving chain to a selected one of a plurality of axially aligned sprockets forming a multistage sprocket assembly, said derailleur comprising:
    a fixing member;
    a supporting member swingably supported to said fixing member by a first vertical shaft, said supporting member being swingable to move along the direction of the axes of said sprockets around said first vertical shaft;
    a return spring interposed between said fixing member and said supporting member for biasing said supporting member relative to said fixing member;
    a change-over frame swingably supported to said supporting member by a second horizontal shaft, said second shaft having its axis perpendicularly intersecting the axis of said first shaft and being disposed at the position where an extension line of the axis of said first shaft passes through the axis of said second shaft, said change-over frame being swingable together with said supporting member to move along the direction of the axes of said sprockets around said first shaft with respect to said fixing member and carrying first and second pulleys for guiding a driving chain, said first pulley being supported rotatably to the foremost end of said change-over frame through a third horizontal shaft in parallel with said second shaft.

2. A bicycle derailleur as in claim 1 further comprising a tension spring interposed between said change-over frame and supporting member for biasing said change-over frame relative to said supporting member in a direction of tensioning a driving chain.

3. A derailleur for a bicycle according to claim 2, wherein said fixing member comprises a bracket member for supporting said derailleur to a fork end of a bicycle and an extension extending from said bracket member along a chain stay of the bicycle, said extension having at the foremost end thereof a horizontal portion which extends toward said sprockets and supports said first vertical shaft, and supports inwardly toward the sprockets through said first vertical shaft said supporting member carrying said change-over frame.

4. A derailleur for a bicycle according to claim 2 or 3, wherein said supporting member has a top plate and a pair of side plates connected therewith and has an inverted U cross sectional shape, said top plate supporting said first vertical shaft, said side plates supporting therebetween said second horizontal shaft.

5. A derailleur for a bicycle according to claim 2, wherein a position adjusting means is provided between one of said change-over frame and supporting member and said fixing member for adjusting said second pulley supported to said change-over frame in position with respect to said sprocket assembly.

6. A derailleur for a bicycle according to claim 2, wherein one of said fixing member and supporting member has a fixture for a control wire for swingably operating said supporting member, and the other has a support for an outer sheath guiding said wire.

7. A derailleur for a bicycle according to claim 6, wherein said fixing member supports an arm swingably through a fourth shaft extending vertically, said arm carrying one of said fixture and support, said fourth shaft supporting therewith said return spring, said return spring being retained at one end thereof to said arm and at the other end to said supporting member.

* * * * *